United States Patent [19]

Tortorich et al.

[11] 4,165,186
[45] Aug. 21, 1979

[54] PHOTOGRAPHIC CHEMICAL MIXING SYSTEM

[75] Inventors: David J. Tortorich, New Orleans, La.; Lyle J. Bricker, 110 Gladys St., Fox River Grove, Ill. 60021; John P. Yasenak, 832 Foxdale St., Winnetka, Ill. 60093

[73] Assignees: Lyle J. Bricker, Fox River Grove; John P. Yasenak, Winnetka, both of Ill.

[21] Appl. No.: 741,628

[22] Filed: Nov. 15, 1976

[51] Int. Cl.$^2$ .......................... B01F 5/12; B01F 15/00
[52] U.S. Cl. ..................... 366/142; 366/153; 366/262; 222/64; 354/324
[58] Field of Search .............. 259/4, 8, 18, 36, 168; 222/64; 354/324; 366/142, 153, 262

[56] References Cited

U.S. PATENT DOCUMENTS

| | | | |
|---|---|---|---|
| 2,287,396 | 6/1942 | Roth | 126/380 |
| 3,804,297 | 4/1974 | Jurjans | 222/64 |
| 3,846,818 | 11/1974 | Merz | 354/324 |
| 3,976,109 | 8/1976 | Bailey | 259/4 R |
| 4,050,447 | 9/1977 | Terracciano | 99/330 |

Primary Examiner—Harvey C. Hornsby
Assistant Examiner—Timothy F. Simone
Attorney, Agent, or Firm—Trexler, Wolters, Bushnell & Fosse, Ltd.

[57] ABSTRACT

An apparatus for mixing photographic process chemicals, and supplying the mixed chemical to a film processing unit. The apparatus provides a chemical holding tank having a water supply inlet and a chemical discharge outlet thereon. The tank is provided with submersible pumps for agitating the contained chemical. Sensors on the inner portion of the tank detect when the process chemical reaches a minimal level whereupon water is added through the water inlet to fill the tank to its maximum whereupon the water supply is automatically shut off. In the preferred embodiment, an operation can add dry chemicals or liquid concentrate to form the finished process chemical. The sensors can be adjusted to vary water levels as needed for adapting the system to different chemical-water mix ratios as specified with the concentrated chemicals supplied by different manufactures. The apparatus additionally is provided with a reservoir tank which can supply processed chemicals to maintain the minimal level in the tank after an alarm has alerted a technician that the minimum level is reached.

13 Claims, 10 Drawing Figures

DEV. FIXER WATER

PHOTOGRAPHIC CHEMICAL MIXING SYSTEM

BACKGROUND OF THE INVENTION

1. Field of the Invention

The present invention relates to chemical mixers, and more particularly, the present invention relates to a chemical mixer which maintains a minimal chemical fluid level, and replenishes the fluid level by adding water up to an adjustable maximum level, so that dry chemicals can be added to give a proper chemical concentration to the mix. The maximum level is adjustably set depending on manufacturers' chemical-water mix specifications as to the dry chemical or liquid concentrate to be mixed.

2. General Background and Prior Art

The use of chemicals in different types of processes usually requires a chemical which has been tightly controlled as to quality. In many systems, variations in the concentrate of different components of a given chemical in the process can bring undesirable and unforeseen results. This is especially true in the photographic processing industry, where the control of processing chemicals such as developers and fixers must be maintained in order to provide high quality finished photographs or negatives. The same holds true in the X-ray field as well.

Generally, chemicals are shipped from a manufacturer to individual users, and this is most often done in the dry or liquid concentrate chemical form for both safety, economy and convenience. The dry and liquid concentrate chemicals are lighter and thus more economical to ship. Dry chemicals also can be packed in cardboard or like unbreakable containers not as susceptible to spilling and breaking.

This creates a great need for a device and method for preparing the dry or liquid concentrate chemicals properly so that the manufacturers' specifications and hence overall quality is maintained by the individual who mixes the chemical prior to their actual use in a given process. This can be done in a variety of ways such as hand mixing or batch preparation which is discontinuous and time consuming.

Generally, the manufacturer will specify the amount of water to be added to his dry chemical packaged mix or liquid concentrate. Unfortunately, manufacturers do not maintain a standard chemical concentrate, even within like industries, such as the photographic processing industry. Thus, the usual manner for mixing chemicals is hand mixing wherein the amount of water is ascertained, added to a suitable container, thereafter the dry chemicals are emptied into the measured water quantity and agitated until a homogeneous solution is achieved.

Hand mixing is usually messy and unpleasant and can be time consuming. Additionally, it is subject to human error which can be fatal to chemical processes which require tight quality control such as photographic processing. In an economic sense, when an operator of a photographic processing machine is forced to stop printing photographs or X-rays because his chemical solution is depleted, the operation begins to lose money when the operator is forced to stop his work in order to replenish his processing chemicals by a hand mixing process.

Some prior art devices have attempted to automatically mix chemicals in order to solve some of the above mentioned problems. However, mixers of the prior art generally are manufactured only to use a given concentrate of dry or liquid concentrate chemical which usually involves the purchase of chemicals from the manufacturer of the mixing device. Additionally, many prior art units automatically add all the dry or liquid concentrate chemicals to be added at one time to a water solution thereby producing undesirable crystal precipitates which result from reactions occurring when the different chemicals hit the water solution simultaneously. Several units are extremely sophisticated and costly. Generally, devices of the prior art are not easily adaptable to individual needs and circumstances. If a chemical comes from a specific manufacturer requiring specific amounts of water to form a certain solution, the usual alternative is a hand mixing or like procedure.

General Discussion of the Present Invention

The present invention provides a chemical mixing system which can be adapted to virtually any dry chemical mix and its associated manufacturers' specifications. The device features a chemical holding tank having level sensors which maintain a minimum fluid level. When a desired mixed liquid chemical solution within the tank reaches the lower level of the tank, a sensor in the tank sounds an alarm alerting the technician to begin replenishing the system to a desired maximum level. The technician initiates a mixing cycle by pressing a "fill" button which adds water to the solution up to a maximum preset level.

The maximum level can be adjustably set to meet any manufacturers' specifications as to a water, dry or liquid concentrate chemical ratio. In the preferred embodiment, when the water level reaches a preset maximum, it automatically turns off whereupon the operator can add dry chemicals as necessary in separate order thereby eliminating the chance for the formation of undesirable precipitates which might occur with simultaneous addition of the chemicals.

In one alternative embodiment, a completely automatic chemical mixing apparatus is provided which utilizes a plurality of measured volume dispensing chambers for desired chemical concentrates, which chambers are filled automatically from larger concentrate holding tanks, and dispensed into the mixer in a desired sequence when the mixing tank is to be replenished.

Mixing pumps are provided for agitation of the water contained within the tank which pumps can be activated prior to the addition of dry or concentrated liquid chemicals. The pumps can additionally be independently activated at any time in order to agitate the chemical within the tank and thereby prevent stratification.

A "bird feeder" reservoir is provided which adds chemical to the tank when the tank reaches its minimal level. The "bird feeder" reservoir maintains a minimum level thereby allowing the operator additional time to finish processing film or X-rays with which he is urgently engaged, or to perform other important tasks before he is forced to mix additional chemicals by operating the control unit which begins the aforementioned fill cycles and mix cycles.

In another alternative embodiment of the apparatus of the present invention, the "bird feeder" reservoir directly feeds chemical solution to the processor rather than replenishing the main chemical holding tank itself. Therefore, with this alternative embodiment of the apparatus of the present invention, the device continuously provides developing or like solution to the processing unit while the operator is forced to perform the necessary mixing operations. In fact, with this alternative embodiment the operator only loses the time necessary to add the dry chemicals and activate the mixing pumps. During the fill cycle, he can continuously process film as the tank will automatically shut off the supply of water when the maximum preset level is sensed.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Structure

Figure 1:
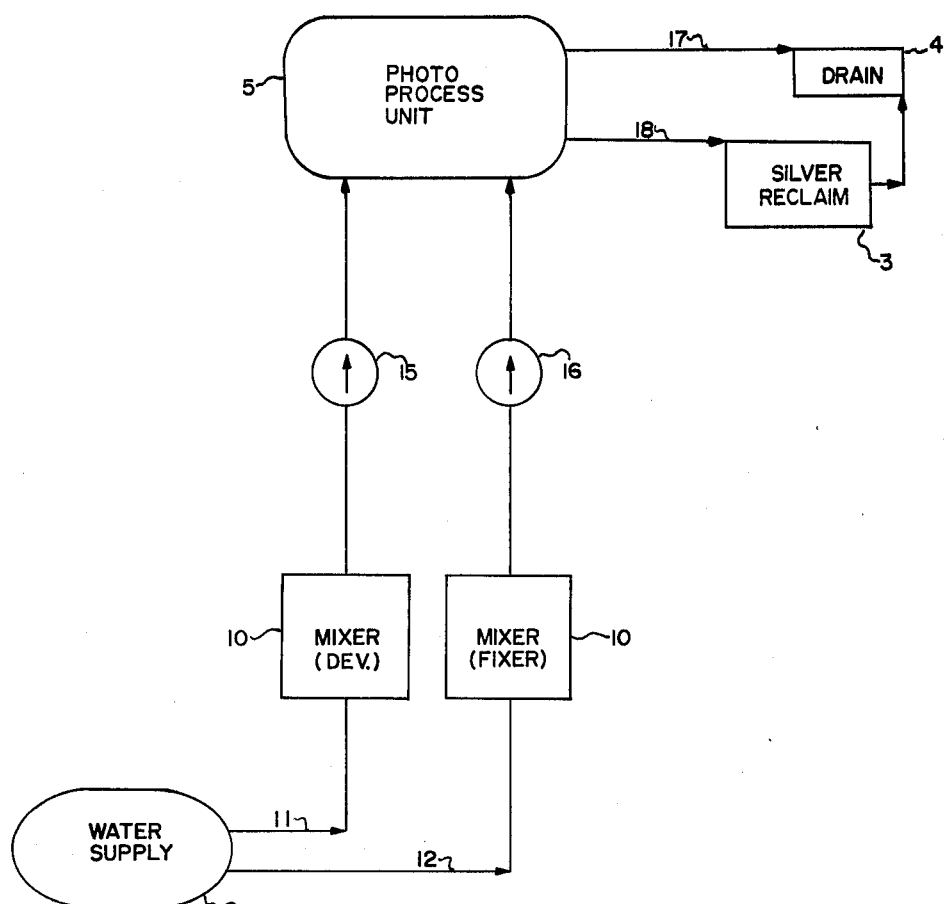
FIG. 1 is a schematic diagram of the preferred embodiment of the chemical mixing system of the present invention.

FIG. 1 illustrates an exemplary chemical process in which the mixing apparatus of the present invention designated by the numeral 10 in FIG. 1 can be utilized. The system shown in FIG. 1 is a photographic developing process which utilizes two mixers 10 for the providing of developer and fixer separately to the photographic developing process unit designated by the numeral 5 in FIG. 1. Each mixer 10 is connected to a water supply through feed lines 11,12. The water supply is necessary to replenish the water level to a maximum whereby dry chemicals can be added to provide a finished liquid chemical of proper concentration. In the photographic process of FIG. 1, one mixer supplies developer while the second supplies fixer, both known chemicals in the art for the processing of black and white photographs, X-rays, film negatives, prints and the like.

Pumps 15,16 supply the necessary power to transmit developer and fixer as needed to the photo processing unit 5. Waste developer and fixer are discharged from the process unit through discharge lines 17,18 respectively where the developer enters a suitable drain while the fixer can first be sent to a silver reclamation process 3 and then to a suitable drain 4.

Figure 3:
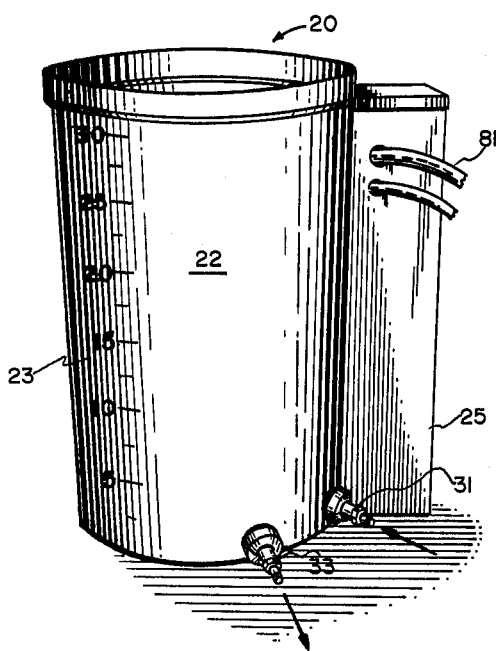
FIG. 3 is a perspective view of the preferred embodiment of the apparatus of the present invention illustrating the main chemical holding tank and the "bird feeder" reservoir enclosure attached thereto.
Figure 4:
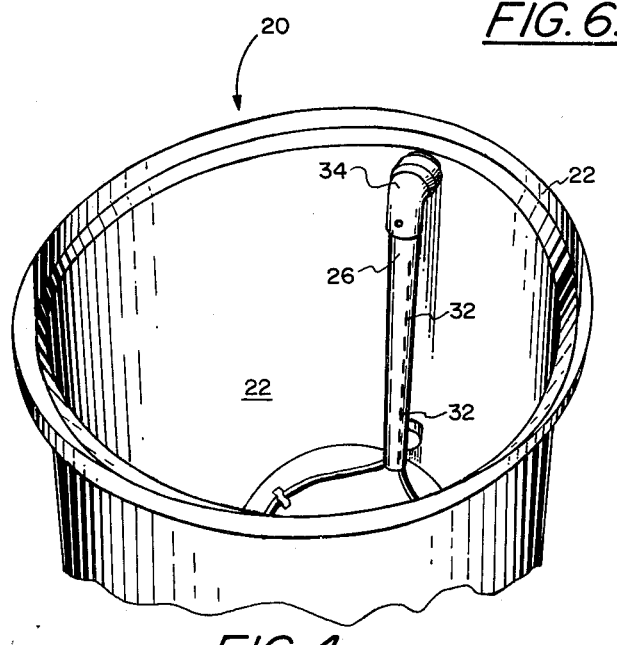
FIG. 4 is a partial perspective view of the tank of the apparatus shown in FIGS. 2 and 3, illustrating the housing for the level sensors.

FIGS. 2-8 illustrate the preferred embodiment of the apparatus of the present invention, designated generally by the numeral 20. Chemical mixer 20 is provided with a main holding tank 22 having an attached "bird feeder" reservoir 24 which reservoir is enclosed and supported in the exterior reservoir housing 25. Level sensors 28-30 are provided within sensor housing 26 which is supportably mounted vertically within tank 22 as is best illustrated by FIG. 4. The apparatus is further provided with submersible pumps 40,41 for agitating the chemical solution contained within tank 22.

Figure 7:
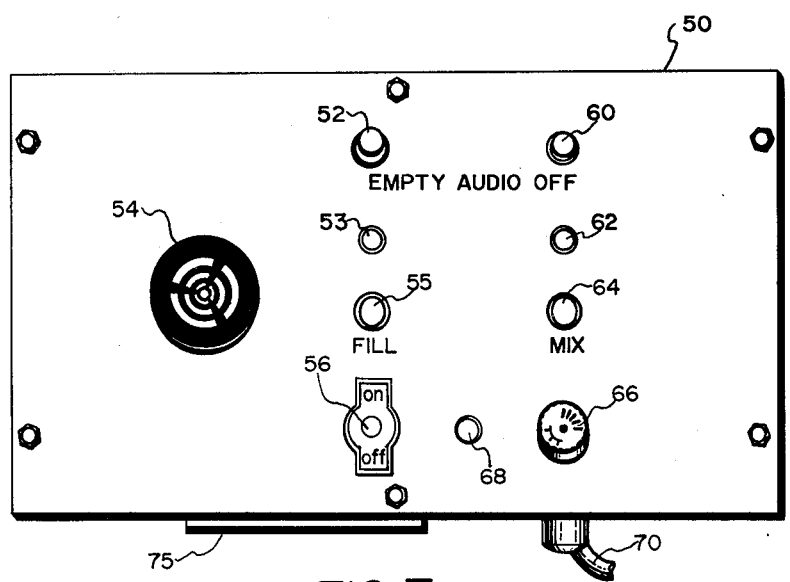
FIG. 7 is a plan view of the control panel of the preferred embodiment of the apparatus of the present invention.

A control panel 50 which is best illustrated in FIG. 7 is provided to control the various electrical functions which operate mixer 20.

Tank 22 is preferably any type of chemically resistant tank suitable for holding any type of corrosive or like chemical therein. In the preferred embodiment, tank 22 has an exemplary volume of 30 gallons. Tank 22 can be marked with increments 23 as shown in FIG. 3 to show the quantity of solution contained at a given time. In FIG. 3, tank 22 is graduated in exemplary 2½ gallon increments. Examples of materials which can be used for the tank 22 are polypropylene, glass, polycarbonate, stainless steel, or any other like corrosion resistant product. In the preferred embodiment, the tank is manufactured of polypropylene. Tank 22 is provided with a water inlet 31 through which water can be fed from any tap water source. The flow of water into tank 22 through inlet 31 is controlled by a conventional solenoid in the preferred embodiment as will be described more fully hereinafter.

The inside portion of tank 22 is provided with a housing 26 for sensors 28-30. Housing 26 can be for example 1-inch pvc (polyvinyl chloride) pipe having solution inlets 32 thereon as can be seen best in FIG. 4. Sensor housing 26 additionally provides a conduit through which electrical lines can be routed to pumps 40,41 as can best be seen in FIGS. 4 and 6. The upper portion of housing 26 is provided with a 90° bulkhead fitting 34 through which sensors 28,29 and electrical feed wires can be exited through the wall of tank 22. A "bird feeder" reservoir 24 is attachably mounted to the outer portion of tank 22 within housing 25. The "bird feeder" can be for example of one gallon volume. "Bird feeder" 24 acts as a reservoir to add the chemical solution to the tank as necessary when the tank reaches its minimal level as determined by low level sensor 29. Flow from the "bird feeder" 24 is controlled by reservoir release solenoid 35 as can best be seen in FIG. 2. When reservoir release solenoid 35 is actuated, it allows air to vent the top portion of reservoir 24 through vent line 24A thereby discharging the contents into tank 22 through reservoir discharge 37 as can best be seen in FIG. 2.

Figure 5:
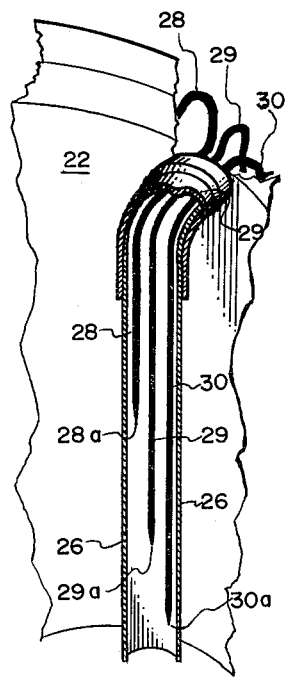
FIG. 5 is a sectional view of the housing for the level sensors of the preferred embodiment of the apparatus of the present invention.

Sensors 28-30 are illustrated in FIG. 5. In the preferred embodiment, three sensors are utilized and all are manufactured for example of stainless steel wire having a plastic chemical resistant coating thereon. The tip portions 28A-30A of each sensor 28-30 is exposed, and not coated with plastic, and thereby forms the sensing portion of the sensor 28-30 itself. Tips 28A, 29A and 30A are preferably manufactured of platinum and form a platinum electrode tip to each sensor 28-30. Upper sensor 28 provides a high level sensor which normally will dictate the maximum fluid level that can be maintained within tank 22. Low level sensor 29 is set at a medium elevation and dictates the usual minimum level at which the fluid will fall within tank 22. The third sensor, reference sensor 30, is the lowest of the three sensors in elevation and its tip 30a is placed at the approximate bottom of tank 22.

The reference sensor 30 forms an electrical connection with either low level sensor 29 or high level sensor 28, depending on the switching which had taken place in panel 50 to cause electrical current to flow from one sensor 28,29 to the reference sensor 30. It should be noted that the circuit will not close between two sensors unless conductive fluid contacts between the two. The operation of sensors 28-30 and their importance to the operation of the apparatus of the preferred embodiment 20 will be more fully discussed hereinafter. It should be noted at this point however that high level sensor 28 determines the maximum level of fluid in tank 22. Normally, water will be added through inlet 31 until it reaches the high level as determined by high level sensor 28.

As a fail-safe feature of the preferred embodiment, an electrode can be formed by bolting a platinum coated titanium screw through the tank 22 at a level above the highest possible level of the mixture. This screw would act as an emergency cut off to the high level electrode. It is a safety device to prevent a spill if the high electrode 28 fails. The titanium screw would be electrically on the same circuit as high level sensor 28.

High level sensor 28 can be adjustably located by pulling on the end portion of it to thereby locate the platinum electrode tip 28a as needed to affix the amount of water which can be added. This is important because different manufacturers of dry or liquid concentrate chemicals (which are added to water to make a final process solution) utilize differing mix ratios to form the finished product. For example, Eastman Kodak may require 25 gallons of water for a package of their developer which comes in dry form. A similar developer as manufactured by E. I. Dupont de Nemours, Inc. may require 24 gallons of water to form the finished developing solution, whereas the developer in dry form as manufactured by GAF Corporation may require 23 gallons of water added to the dry chemical to make a finished developing solution. It can be seen that the device should be adjustable to allow for these differences in volume as dictated by differences in manufacture of the dry chemical. It is the adjustment upwardly or downwardly of high level sensor 28 (which controls the upper level of dilution water added to the tank 22) that affords this adjustability in the mixer 20 of the present invention.

Figure 6:
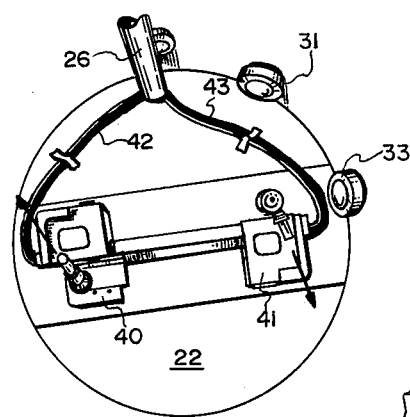
FIG. 6 is a partial perspective view of a bottom portion of the inside of the main holding tank of FIGS. 2-4.

In the preferred embodiment as can best be seen by FIG. 6, two mixing submersible pumps 40,41 are provided and affixed to the lower portion of tank 22. Pumps 40,41 can be electrically operated and receive electrical power through cables 42,43 which are fed to pumps 40,41 through housing 26. When activated, pumps 40,41 are oriented to give a vortex effect to the solution contained within tank 22. As can best be seen by FIG. 6, the pumps are oriented in opposite direction to create the vortex effect. To assure mixing at lower and higher levels within tank 22, one pump can be discharged at a 90° angle with respect to the bottom of tank 22 and the second pump oriented at a 45° angle from the bottom of tank 22. The direction of discharge from pumps 40,41 is illustrated by the arrows in FIG. 6.

Pumps 40,41 can be protectively coated to insure that they will not be corroded by the chemical solutions mixed within tank 22. In the preferred embodiment, the pumps 40,41 are a submersible type and are preferably epoxy clad. Pumps 40,41 can have a discharge which is adequate to form a vortex in agitating the chemical fluid contained within tank 22. An exemplary pump capacity of 5 gallons per minute for each pump will create such an effect.

Figure 2:
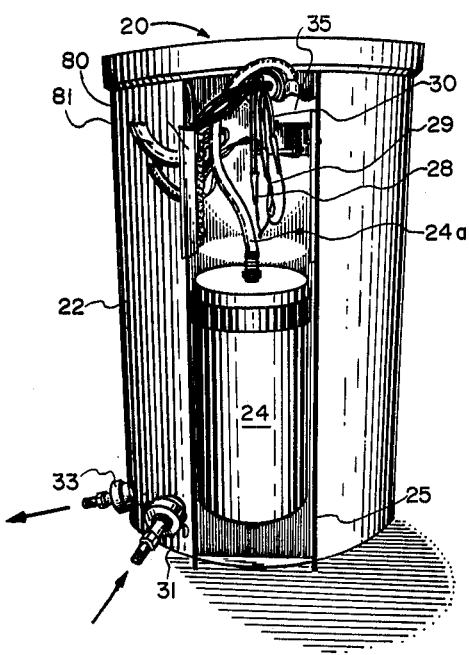
FIG. 2 is a perspective view of the preferred embodiment of the apparatus of the present invention with the "bird feeder" reservoir enclosure removed to illustrate the reserve tank and associated components.

The apparatus of the present invention 20 is controlled by control box 50 having a panel which provides an empty light 52, a fill light 53, an audio alarm 54, a fill button 55, an on-off switch 56 which activates the entire system 20, an audio off button 60, a mix light 62, a mix button 64 and a one-amp fuse 66. Power on indicator light 68 is also provided. The entire system is powered by an exemplary 110 volt-60 cycle power supply designated by the numeral 70 in FIG. 7. A receptical 75 is provided on control box 50 which receptical receives an interconnection cable 81 from terminal block 80 as is illustrated in FIG. 2. When the solution is in the finally mixed completed stage, it is discharged through replenishing line 33 to the photograph processing unit or any associated process system to which the mixer 20 supplies any desired chemical solution.

Figure 9:
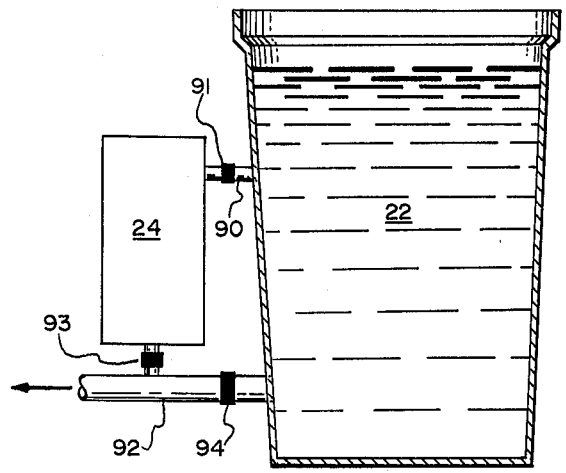
FIG. 9 is a schematic diagram of a first alternative embodiment of the apparatus of the present invention.

FIG. 9 illustrates a first alternative embodiment of the apparatus of the present invention. In FIG. 9, reservoir 24 is connected to tank 22 by means of upper feed line 90 and lower Tee 92. A solenoid 91 controls the flow of fluid from tank 22 into reservoir 24 through line 90. The flow of fluid from tank 22 through Tee line 92 is controlled by solenoid 94. The flow of fluid from the lower end portion of reservoir 24 into the Tee line 92 is controlled by solenoid 93. In operation, when the solution level gets down to the point where lower sensor 30 detects the lowest desired level, the alarm will signal and the solenoid between the main tank 22 and the Tee line 92 will close and the solenoid between reservoir 24 and Tee 92 will open. This solenoid is designated by numeral 93 in FIG. 9. The reservoir 24 will then begin directly feeding the desired chemical directly to the process unit (see arrow, FIG. 9). The solenoid 91 controlling the flow of fluid from tank 22 to reservoir 24 at the upper end portion of reservoir 24 will close. Water is then added to tank 22 diluting the concentrate of chemical added thereto, while the process unit is being directly fed by reservoir 24. At the end of the mix cycle, the solenoid 93 between reservoir 24 and Tee 92 will close, and the solenoid 94 between the main tank 22 and Tee 92 will open. Additionally, solenoid 91 between the top portion of reservoir 24 and the top level of tank 22 will open, allowing concentrated chemical to flow into and replenish reservoir 24.

Figure 10:
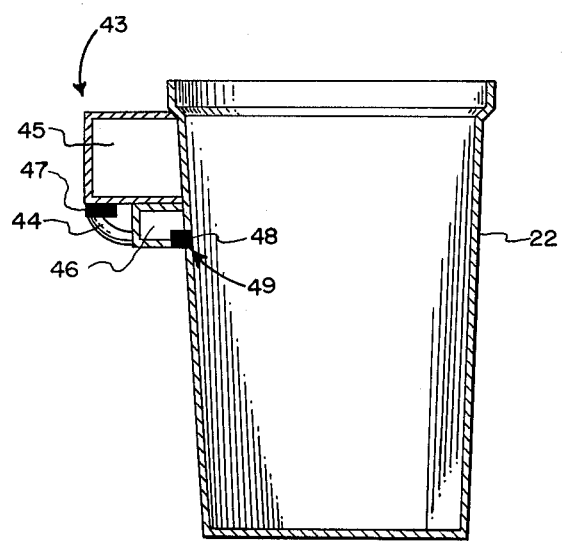
FIG. 10 is a sectional view of a second alternative embodiment of the apparatus of the present invention.

FIG. 10 illustrates a second alternative embodiment to the chemical mixer of the present invention. As can best be seen in FIG. 10, the mixer can be made fully automatic by utilizing a plurality of concentrated chemical storage tanks 45 which can be mounted on tank 22. Each storage tank 45 has a corresponding dispensing chamber 46 which is connected by means of hose 44 to storage tank 45. Solenoids 47,48 can be provided at the outlet of storage tank 45 through which fluid will flow from storage tank 45 into hose 44 thereby filling dispensing compartment 46, and at the outlet of dispensing chamber 46 into mixing tank 22. Any number of these concentrated chemical storage tanks 45 can be provided on tank 22, with each storage tank 45 having the same dispensing chamber 46 and its associated connecting hose 44 and solenoids 47,48 as described above. Each dispensing unit, designated generally by the numeral 43 in FIG. 9 would be able to handle a single type of dry or liquid concentrate chemical. If, for example, mixer 20 were to be utilized for the mixing and dispensing of "developer" in the photographic industry, three chemical dispensing units 43 would be provided on tank 22. The three units 43 would correspond to the three conventional chemicals which would be supplied by a manufacturer and make up the final developer. These would be dispensed into the solution in sequence. For a developer solution, a first concentrated chemical storage tank 45 would contain a caustic solution, the second would contain a gluderaldehyde, and a third storage tank 45 would contain a hardener which could be a potassium aluminum sulfate. This is of course exemplary of the type of sequential mixing which could be effected utilizing the present invention.

Operation

Figure 8:
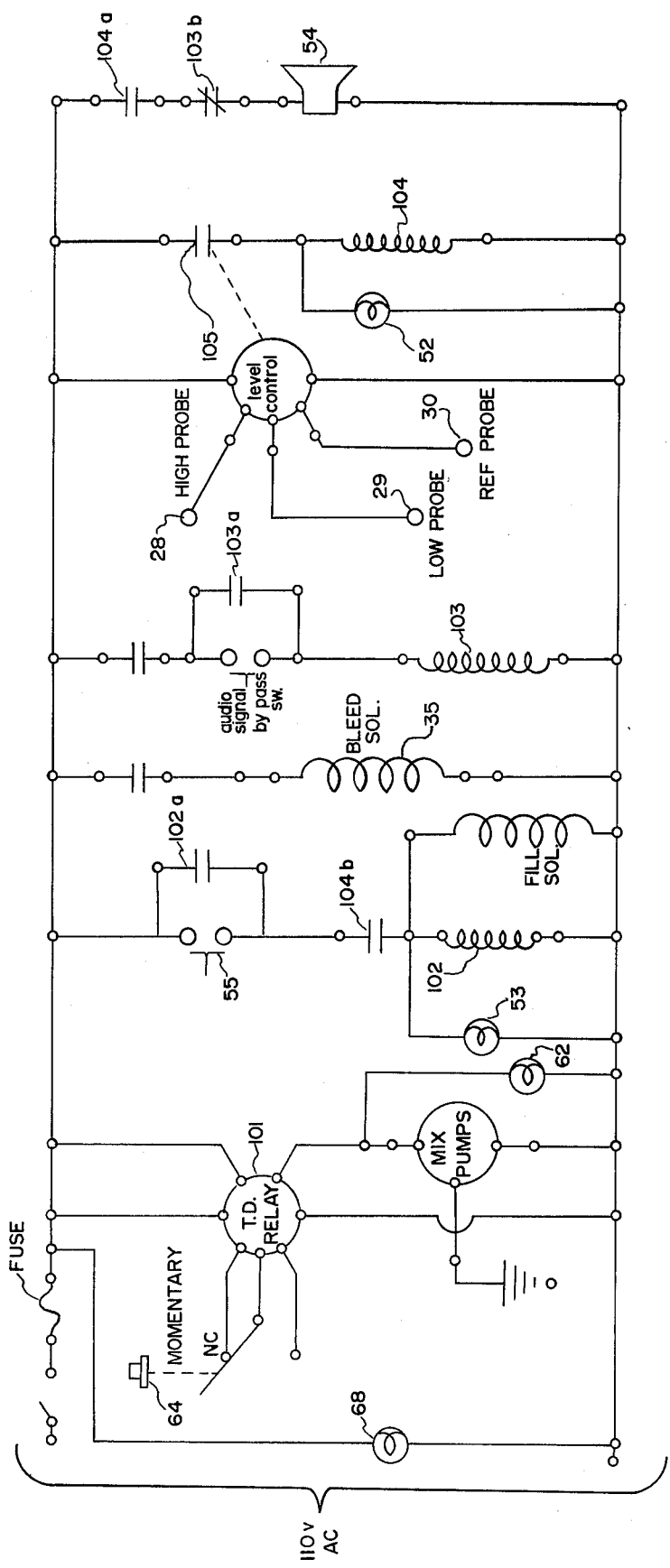
FIG. 8 is a schematic electrical diagram of the preferred embodiment of the apparatus of the present invention.

FIG. 8 illustrates a typical circuit diagram which will be utilized hereinafter to describe the operation of the mix system.

The sequence of operation of the chemical mixer 20 of the present invention begins when the chemical solution in tank 22 has been used down to a point where it is necessary to mix additional solution. When the solution level is below a minimum desired level (for example 5 gallons), low level sensor 29 has its circuit to the reference sensor 30 interrupted because the tip 29a of sensor 29 is deprived of a conductive liquid. This interrupted circuit energizes low level control relay 105 located in the level control circuit. Relay 105 closes empty signal relay 104. The empty indication light 52 is across relay 104, and empty light 52 comes on. At the same time audio alarm 54 is energized through contacts of relay 104a and 103b. This gives an audible signal that can be heard throughout the area adjacent audio alarm 54. The sound is terminated manually by an operating technician by depressing audio off button 60 which energizes audio bypass relay 103. When relay 103 energizes it closes contacts 103a which self locks relay 103a in the energized position. Since relay 104 was previously energized, the contacts for relay 104c allow the tracked path to maintain relay 103 in a locked position, thus will open the contacts on relay 103b which will turn the audio alarm 54 off while allowing empty light 52 to remain on and relay 104 to remain energized.

At this time the technician can depress fill button 55 which will energize fill relay 102. The path of tract flow will be through the relay 102 switch through the narrow closed set of contacts relay 104b through the relay coil to the ground. Across the coil of relay 102 is a fill solenoid which will be energized to turn on the water supply to tank 22 which enters tank 22 through water feed line inlet 31 (see FIG. 2). At the same time fill light 53 will be turned on. At this stage water will be flowing into tank 52 and will continue to flow until the fill solenoid is energized by the circuit from the reference sensor 30 and the top high level sensor 28. Fill switch 55 is a momentary switch and is self latched by the contacts 102a of relay 102.

The water level will continue to rise in tank 22 until the level touches sensing tip 28a of high level sensor 28. At that time the level control relay 105 will be de-energized opening the contacts that supply current to empty signal relay 104. Thus empty signal relay 104 will be de-energized and the empty light 52 will be turned off. Since the fill solenoid and fill relay 102 are held energized through the normally open contacts of relay 104b when relay 104 is de-energized, this will remove the current from relay 102 and the fill solenoid therefore the water supply will be shut off. Also fill light 53 will be turned off. At this time the technician can pour dry chemicals as needed into the tank 22, now filled with necessary dilution water.

Since the amount of water added to the tank is set by the position of the sensing tip 28a of high level sensor 28, adjustment of this sensor 28 is performed before the apparatus is put into operation. The adjustment is made by simply pulling or pushing on sensor 28 from the outside of tank 22 as can best be seen in FIG. 2. Since sensors 28-30 are housed within sensor housing 26 and thus hidden are difficult to see, the portion of sensors 28-30 which leaves tank 22 through bulkhead 34 can be color coded for different depths of each sensor. For example, the high level sensor which is adjusted to meet the volume of water needs for different dry chemicals and their manufacturers' specifications, colored bands can be placed on high level sensor 28 corresponding to each manufacturer of a different type of dry chemical. An example would be a yellow color for a Kodak dry chemical mix with a red color for a mix as manufactured by GAF and a green color for dry chemicals manufactured by DuPont. Thus if a technician were to utilize the chemicals provided for a solution which required dry chemicals as manufactured by Kodak, the technician would simply pull or push on high level sensor 28 as needed to align the yellow color strip with the outlet of bulkhead fitting 34. The location of the strips could be easily placed during manufacture of any individual mixer 20.

Dry chemicals are added as needed to the tank 22, now filled with dilution water. The dry chemicals are added in sequence to prevent the precipitation of undesirable chemicals caused by adding dry chemicals simultaneously. The technician or operator depresses mix switch 64 which is normally placed in an open position and released which causes the contacts of time delay relay to close from pin 1 to pin 3 as can best be seen in FIG. 8. This applies current to mix pumps 40,41. The mix time is determined by the setting of the time delay relay 101, and can be for example 5 minutes, at the time technician is pouring in dry chemicals in sequence which can be any number of dry chemicals as necessary to form a given final chemical solution.

During the addition of the dry chemical concentrates, and up to the timed cycle as set by the time delay relay 101, the pumps 40,41 are mixing the ingredients continuously. This completes the mixing cycle and the chemical solution is now ready to be fed into the processing unit with which it is associated through exit tubing 33 at the bottom portion of tank 22 (see FIGS. 2-3).

As discussed previously, when the level of chemical solution within tank 22 falls below a preset level as determined by low level sensor 29, the audio alarm 54 sounds simultaneously. At this point the technician turns off the audio alarm 54 by depressing the audio off button 60 which actuates audio bypass relay 103. The empty light 52 remains on to remind the technician of the need to mix a new chemical solution and replenish the volume of tank 22. However, the technician may have other work which is "pressing" and in this regard a reservoir or "bird feeder" 24 is provided which will add solution as it is being withdrawn through replenisher line 33 to the processing unit. The reservoir can contain a desired amount of chemical solution which will give the technician any amount of time which is necessary for him to schedule his mix operation. When this time is convenient he can depress the fill button 55 which opens the solenoid on the tap water feed line 31 which supplies water to tank 22. Water enters tank 22 through line 31 and fills it to the level of high level sensor 28. At that time of initial installation, the level of water is adjustable as described above by pushing or pulling on the plastic tubing encapsulating the wire carrying the circuit from the tip 28a of sensor 28.

After the fill light is turned off automatically as described above, and the technician has completed the addition of his concentrated dry chemicals, he can return to other work. The system will complete the mixing action and automatically terminate the pumps 40,41. The cycle is completed by the chemical solution being used down to the minimal level as dictated by sensing tip 29a of low level sensor 29 and reactivating audio alarm 54 as described above.

Since the mix switch 64 is separate in its function, the chemical solution within tank 22 can be agitated at any time simply by depressing mix switch 64. This is a most desirable feature which will greatly improve the consistency of the chemical mixture and result in better quality solution to the associated processing unit. In the case of photographs and photography for example better picture quality will be attained.

The "bird feeder" 24 and its associated circuits is necessary in the system since the technician usually cannot be available for immediate servicing of the mixer 20 when a low level is reached. Without the "bird feeder" reservoir 24, the level of chemical solution in tank 22 would fall below the minimum desired level. When water would be added to the predetermined maximum level as set by high level sensor 28, the additional volume of water below the minimum level would cause a dilution of the mixture beyond that which was contemplated when the original setting was made on high level sensor 28. Thus, the additional "bird feeder" reservoir 24 can contain additional solution which is used to maintain a 5-gallon level for a period of time when the technician is unavailable to begin the fill cycle as described above. As solution in the tank 22 is used to a level below the outlet of the reservoir it will allow air to enter the reservoir and allow solution to flow back into tank 22 maintaining a 5-gallon or like minimal level.

A vent 24a in the top of reservoir 24 allows it to fill with chemical solution during the mix cycle as was described more fully above. A bleed solenoid designated by the numeral 35 in FIG. 2A across the mix circuit opens the vent 24a allowing solution to enter reservoir 24 from tank 22. Deflection plates (not shown) in the bottom of tank 22 can insure adequate circulation of chemical solution into the reservoir into the agitation of the mix cycle.

A pressure sensing switch prevents the reservoir 24 from emptying during a mix only cycle by sensing when the solution is below the maximum fill level.

The path of current to the bleed solenoid 35 will be through contacts 101b. The time delay relay to the normally closed circuit contacts of the pressure sensing switch and through the bleed solenoid 35 to ground. If a solution level is below the preselected level, the pressure sensing switch will be in an open condition, therefore the bleed solenoid 35 cannot be energized until the tanks are filled.

FIG. 9 best illustrates the operation of the first alternative embodiment of the apparatus of the present invention. The first alternative embodiment provides an apparatus which will directly supply process chemical to the desired processing unit when the main chemical tank 22 is in the filling and mixing stage. As can best be seen by FIG. 9, solenoid 94 is normally in an open position, feeding the processed chemical from tank 22 through Tee line 92 to the process unit. When the low level sensor 29 dictates that the low level has been reached in the tank, solenoid 94 will close and simultaneously therewith solenoid 93 will open allowing the flow of concentrated chemical from reservoir 24 through Tee line 92 to the processing unit. Additionally, and simultaneously with the aforementioned solenoid operations, solenoid 91 in line 90 will close, preventing the entry of diluted water (which now will be added to tank 22) into reservoir 24. Thus, a continuous operation is maintained of feeding the concentrated chemical to the process unit, even during the addition of water and concentrated chemicals to the main chemical holding tank 22.

FIG. 10 best illustrates the operation of the second alternative embodiment of the apparatus of the present invention. Concentrated chemical storage tank 45 is filled with a quantity of the desired concentrated chemical liquid. This chemical can be transmitted to dispensing chamber 46 through hose 44. The flow from tank 45 to dispensing chamber 46 is controlled by solenoid 47. The dispensing of the contents of chamber 46 into tank 22 is controlled by solenoid 48. In operation, tank 45 will be of sufficient volume that it can be filled and left unattended for a long period of time as desired, successively filling dispensing chamber 46 as needed after it is emptied into tank 22. Both tanks 45 and 46 are vented so that they will independently empty without having pressure problems. To operate the second alternative embodiment of the apparatus of the present invention, a technician will depress the "fill" button. The dispensing chamber 46 of the first chemical concentrate to be added to tank 22 is emptied by means of solenoid 48 which opens allowing fluid to enter tank 22 through outlet 49. This solenoid valve 48 can be activated by means of a sequential timer which then begins the timed action of pumps 40,41. After a desired time period the timer operates the dispensing solenoid of a second tank containing a second desired solution which will be sequentially added to tank 22 as part of the concentrated chemicals which will mix with water to form a final chemical process solution. The contents of the dispensing chamber 46 in the second unit 43 will be dispensed into tank 22 when the solenoid opens. The sequential timer then operates a third solenoid attached to dispensing chamber 46 of a third unit 43. This entire time mixing continues and continues for an additional time as desired after the final dispensing chamber 46 is empties. It can be seen from the above that a large number of chemical dispensing units 43 can be provided to add sequentially several different chemicals in measured volumes to tank 22. Each individual dispensing chamber 46 is refilled from concentrated chemical storage tank 45 by action of solenoid 46. Solenoid 47 is opened simultaneously with the closing of solenoid 48 after dispensing tank 46 has been emptied. Thus dispensing chamber 46 will be immediately filled and ready for a later dispensing.

If the volume of tank 45 is too large to be mounted on mixing tank 22, huge storage tanks of concentrated chemical can be stored in a remote area and pumped through appropriate hoses to dispensing chambers 46 mounted on mixing tank 22.

A variation of the second alternative embodiment of the apparatus of the present invention as described above utilizes metering pumps instead of dispensing chambers 46. In this variation of the second alternative embodiment, the concentrated chemical would be fed directly into the chemical holding tank 22 through inlets by a precise metering pump. The duration of each metering pump would be controlled by a time delay relay. Thus, the metering pumps could be sequentially activated in the same manner that the various dispensing units 43 are activated using a sequential timer in the second preferred embodiment. As each metering pump is activated, it would precisely dispense a stream of concentrate to the tank 22 for a period of time as set by the time delay relay associated with each metering pump. Variations of the length of time as set on the time delay relay in conjunction with the discharge rating on the metering pump would govern the total amount of concentrated solution which would be added to the tank 22 in a given dispensing. As with the second preferred embodiment, this variation could utilize several metering pumps to dispense several separate chemicals which would be added to a given "mix". Activation of the pumps would be automatic when the water level reached low level sensor 29, water added up to high level sensor 28, and the mixing as described more fully above completed. This variation of the second preferred embodiment would also provide a totally automatic unattended system.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. A photographic chemical mixer for supplying pre-mixed chemical solution to a film processing unit, or the like, comprising: a fluid holding tank for said pre-mixed chemical solution; low level sensing means in said tank for detecting a preset low fluid level in said tank; high level sensing means in said tank for detecting a preset high fluid level in said tank; liquid supply means for adding diluting fluid to said tank which fluid is designed to be mixed with a concentrate to provide said pre-mixed chemical solution; control means associated with both said sensing means and said liquid supply means, and including indicating means operably connected with said low level sensing means for indicating the attainment of said low fluid level; means for selectively activating said liquid supply means; and means operably associated with said high level sensing means for deactivating said liquid supply means when said high fluid level in said tank is reached; and reservoir means adapted to contain a quantity of said pre-mixed chemical solution, said reservoir means being operably connected with said tank such that upon the liquid level in said tank reaching said low fluid level, said reservoir means will feed its premixed solution to continue the supply of said pre-mixed chemical solution to a processing unit without interruption, by maintaining the liquid level of said pre-mixed solution in said tank at said low fluid level for a period of time, with the retention of said low fluid level by said reservoir means serving to maintain a desired volumetric difference between said low and high fluid levels, to replenish said pre-mixed chemical solution, in said tank to said high fluid level said means for selectively activating said liquid supply means is operated to add said diluting fluid to the tank to be mixed with a pre-packaged concentrate added within said tank, said tank being filled to said high fluid level automatically to replenish the supply of pre-mixed chemical solution at the desired strength, said replenishing of the chemical solution being attained without the necessity of an operator having to measure said diluting fluid or commence the replenishing operation immediately upon attainment of said low fluid level.

2. The apparatus of claim 1, wherein said low level sensing means is comprised of:
   (i) a reference probe electrode mountable on the inner portion of said holding tank, said reference probe being capable of conducting current,
   (ii) a low level probe mountable on the inner portion of said tank in an adjustable position, said probe being capable of conducting electrical current.

3. The apparatus of claim 1, wherein said high level sensing means is comprised of:
   (i) a reference probe mountable on the inner portion of said holding tank, said reference probe being capable of conducting electrical current, and
   (ii) a high level probe mountable on the inner portion of said tank, said high level probe being capable of conducting electrical current, electrical current flowable between said high level probe and said reference probe when an electrical conductive fluid is contained within said tank between the tip portion of said reference probe and the tip portion of said high level probe.

4. The apparatus of claim 1, further comprising mixer means in said tank for agitating fluids held in said tank.

5. The apparatus of claim 4, wherein said mixer means is at least one pump placed within said tank.

6. The apparatus of claim 1, wherein there is further provided a water tight conduit connectably mounted between said reservoir means and said tank, said conduit forming a fluid connection between said reservoir means and said tank, said water tight conduit provided with a valve means for controlling the flow of fluid between said reservoir means and said tank.

7. The apparatus of claim 4, wherein said mixer means is manually activated, and said mixer means remains temporarily activated thereafter by a time delay relay.

8. The apparatus of claim 1, wherein said reservoir means is deactivated, halting the flow of replenishing fluid to said tank when said liquid supply means is activated to add diluting fluid to said supply tank.

9. The apparatus of claim 1, wherein said high level sensing means can be adjusted so that said high level sensing means can detect the high fluid level in said tank at a variety of fluid levels corresponding to the adjusted position of said high level sensing means.

10. The apparatus of claim 1, further comprising dispensing means on said tank for adding a measured volume of concentrated chemicals to said tank, said dispensing means being activated to add said measured volume of concentrated chemicals to said tank by said low level sensing means automatically after the liquid level in said tank reaches said low level sensing means.

11. Apparatus as defined in claim 1 further including fluid discharge means leading from said holding tank and including valve means; selectively operable means for connecting said reservoir means to said fluid discharge means, such that said fluid discharge valve means may be closed when said low level is reached thereby maintaining the low level of said solution in said holding tank, and said selectively operable means operated to connect said reservoir directly to said fluid discharge means thereby to effect supply of said pre-mixed solution to said processing unit directly from said reservoir means.

12. Apparatus as defined in claim 1, wherein said reservoir means includes an outlet opening into said holding tank at approximately said low fluid level, such that when said pre-mixed solution in said holding tank is above said level, solution will not be discharged from said reservoir, but when said solution in said holding tank drops to the level of said outlet or below, premixed solution will flow from said reservoir means into said holding tank to maintain said low fluid level thereby enabling the continuing of supply of said premixed chemical solution to said processing unit, and also maintaining the desired volumetric differential between said low and high fluid levels thereby assuring that a predetermined amount of diluting fluid will be supplied preparatory to mixing with said concentrate, without the necessity of the operator having to measure said diluting fluid.

13. Apparatus according to claim 1, further including means for adding a pre-measured amount of concentrate to said holding tank once said diluting fluid has been added thereto.

* * * * *

UNITED STATES PATENT AND TRADEMARK OFFICE
CERTIFICATE OF CORRECTION

PATENT NO. : 4,165,186
DATED : August 21, 1979
INVENTOR(S) : David J. Tortorich, Lyle J. Bricker and John P. Yasenak It is certified that error appears in the above–identified patent and that said Letters Patent are hereby corrected as shown below:

Column 12, cancel lines 62 through 68 (Claim 10) and substitute therefor:

--10. The apparatus of Claim 1, wherein said low level sensing means can be adjusted with respect to the liquid level within said tank, for detecting the low fluid level within said tank at different fluid levels within said tank.--

Signed and Sealed this

Fifth Day of February 1980

[SEAL]

Attest:

SIDNEY A. DIAMOND

Attesting Officer

Commissioner of Patents and Trademarks